3,254,036
THERMALLY STABLE CARBODIIMIDE POLYMERS

Gene C. Robinson, Baton Rouge, La., assignor to Ethyl Corporation, New York, N.Y., a corporation of Virginia
No Drawing. Filed Apr. 27, 1962, Ser. No. 190,833
6 Claims. (Cl. 260—2)

This invention relates to and has as its chief object the provision of novel solid polycarbodiimide polymers of enhanced thermal stability. It also relates to the novel process for the production of such thermally stabilized polymers.

According to this invention, a solid carbodiimide polymer is contacted with an anhydride of a saturated monobasic carboxylic acid. In this way, a novel polycarbodiimide polymer of enhanced thermal stability is provided.

Solid carbodiimide polymers are known to the art. Several procedures are available whereby carbodiimide monomers can be converted into these polymers which in general have molecular weights in the range of from about 2,000 to about 300,000. An excellent method for effecting this polymerization is described in my co-pending application Serial No. 190,834, filed April 27, 1962, now U.S.P. 3,200,087. According to that method, solid carbodiimide polymers are produced by contacting a polymerizable carbodiimide monomer with an organometallic polymerization catalyst at a temperature in the range of from about 0 to about 120° C. sufficient to form the polymer but insufficient to effect substantial thermal degradation thereof. The catalyst used in the foregoing process is a hydrocarbon compound of a metal of Groups I–A through III–A of the Periodic Table (see the Periodic Chart of the Elements as set forth in "Handbook of Chemistry," Lange, 6th ed. (1946), pp. 58–59). An outstanding example of these catalysts is butyllithium.

Unfortunately, these polycarbodiimide polymers, whether made by the above preferred process or other procedures, suffer an inherent deficiency. They are readily degraded when exposed to temperatures in the order of about 150° C. This degradation can be extremely extensive. My experimental work has shown, for example, that polydiethylcarbodiimide can be essentially completely decomposed when exposed to temperatures in the range of about 150–175° C. This work has definitely indicated that the thermal decomposition is a depolymerization reaction whereby the monomeric units of the polymer are liberated upon application of heat.

However, by virtue of this present process, polycarbodiimide polymers of significantly enhanced thermal stability are produced.

The amount of the anhydride used in the present process does not appear to be critical. Thus, the amount used may range from about 1 weight percent to about 200 weight percent of the polymer.

Suitable anhydrides of saturated monobasic carboxylic acids which may be used in effecting the process of this invention include acetic anhydride, propionic anhydride, butyric anhydride, caproic anhydride, octanoic anhydride, decanoic anhydride, the anhydride of cyclohexane carboxylic acid, and similar substances. The saturated aliphatic monobasic carboxylic acids from which these anhydrides are derived preferably contain up to about 12 carbon atoms in the molecule. It will be understood, however, that similar anhydrides may be used successfully in the practice of this invention. Hence, effective use may be made of the anhydrides of stearic acid, benzoic acid, p-tert-butyl benzoic acid, and the like substances. Acetic anhydride is preferred because of its availability and low cost.

The polycarbodiimides which are used in forming the novel, thermally stabilized polymers of this invention have the structure

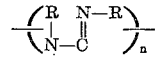

where R is a hydrocarbon group (e.g. ethyl, phenyl, 2-phenylethyl, allyl), and $n$ is an integer corresponding to the number of monomeric units chemically bonded together in the polymer. Exemplary of such polymers are poly-dimethylcarbodiimide, poly-diethylcarbodiimide, poly-diisopropylcarbodiimide, poly-dibutylcarbodiimide, poly-dioctylcarbodiimide, poly-diphenylcarbodiimide, poly-di-p-tolylcarbodiimide, poly-di-m-ethylphenylcarbodiimide, poly-di-2,4-xylylcarbodiimide, poly-dibenzylcarbodiimide, poly-di-2-phenylethylcarbodiimide, poly-di-p-tert-butylbenzylcarbodiimide, poly-diallylcarbodiimide, poly-phenylmethylcarbodiimide, and the like. Preferably, the alkyl, alkenyl, aryl, alkaryl, or aralkyl groups present in these polymers contain up to about 8 carbon atoms. Interpolymers of 2 or more of the corresponding monomers may also be thermally stabilized pursuant to this invention.

The temperature at which the process of this invention is conducted can range from about 0 up to about 120° C. or thereabouts. The temperature of this treatment will depend to some extent upon the identity of the anhydride used as the treating agent and upon the identity of the particular carbodiimide polymer being subjected to the treatment. In general, however, the temperature should not exceed that at which thermal decomposition of the unstabilized polycarbodiimide polymer would occur.

When using acetic anhydride and the close homologs thereof, effective thermal stabilization is achieved by treating the polymers under ambient temperature conditions. Accordingly, with such anhydrides, treatment temperatures in the range of about 20 to about 50° C. are preferable.

The carbodiimide polymers tend to be essentially insoluble in the anhydride reagents and thus the treated polymers can be readily separated from the treating medium. For this purpose, effective use can be made of filtration, decantation, centrifugation, and the like procedures.

If desired, the process of this invention can be conducted in an inert, organic solvent such as a liquid hydrocarbon (i.e. paraffins, cycloparaffins, aromatics, or mixtures of two or more of these).

The time during which the polymers of this invention are subjected to the above treatment is not all critical. Thus, times ranging from about 10 minutes to about 24 hours may be used.

This invention will be still further understood by reference to the following illustrative example.

Example I

*Polymerization of diethylcarbodiimide.*—Dry toluene (10 ml.) was put into a 25-ml. Erlenmeyer flask along with a boiling stone. The toluene was heated to boiling to expel moisture and air from the flask, and the flask was capped with a serum rubber cap while the toluene was still boiling. The flask was cooled rapidly to 25° C. and the resultant vacuum was broken with dry nitrogen. Diethylcarbodiimide (5 ml.) was introduced into the flask with a hypodermic syringe. Then 0.75 ml. of an 0.4 M solution of n-butyl lithium in toluene was introduced with a hypodermic syringe. Polymerization began within seconds. The flask was cooled to maintain the temperature near 25° C. After 16 hours at 25° C., methanol was added to destroy n-butyl lithium. The product was washed repeatedly on a medium porosity sintered glass filter with methanol. The dried polydiethylcarbodiimide product weighed 4.0 g. and was a white, insoluble solid.

The solid decomposed in a melting point tube near 165° C., giving a colorless volatile liquid.

*Treatment of poly-diethylcarbodiimide.*—A portion (0.3 g.) of the resultant poly-diethylcarbodiimide was immersed in approximately 2 ml. of acetic anhydride at 50° C. After 0.5 hour, the solid polymer was recovered from the acetic anhydride, washed and dried. Thereupon, it was heated to determine the temperature at which thermal decomposition commenced. It was found that it did not decompose until the temperature reached approximately 215–225° C. Therefore, this treatment improved the thermal stability of the polymer by at least 50° C.

Similar results are achieved when the above procedure is repeated using either other polycarbodiimide polymers or other acid anhydrides, or both.

The polymers produced by the process of this invention are useful in the chemical and allied arts. For example, they may be used as thickening agents, especially in aqueous media. By way of example, portions of the polydiethylcarbodiimide made by the procedure of Example I were dissolved in 80 percent acetic acid. Thereupon, the viscosities of the solutions were determined. When the polymer concentration was 1 gram per 100 ml. the solution viscisoty ($N_{sp}/C$) was about 0.51. At a concentration of 4 grams per 100 ml. the viscosity of the solution was about 0.67 $N_{sp}/C$.

The resultant polymers may also find use in the formulation of detergents and water softeners. These polymers are believed to have chelation activity, that is, the ability to complex with metallic ions which are present in water having a hardness above 0. This chelation activity would thereby enable the detergent to exert a greater surface activity per unit weight or enable the reduction of the hardness of the water.

Other uses for the above polymers will now be evident to those skilled in the art.

What is claimed is:

1. A process for enhancing the thermal stability of a solid carbodiimide polymer composed of the recurring structural unit

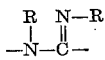

wherein R is a hydrocarbon radical selected from the group consisting of alkyl radicals, alkenyl radicals, aryl radicals, alkaryl radicals and aralkyl radicals, said hydrocarbon radical containing up to about 8 carbon atoms, which polymer is susceptible to thermal degradation when exposed to a temperature of up to about 150° C., such that the thermal degradation temperature of the polymer is raised by at least 50° C., which process comprises the step of effecting contact between said polymer and an anhydride of a saturated monocarboxylic acid containing from 2 to about 12 carbon atoms at a temperature below that at which thermal degradation of the unstabilized polymer would occur.

2. The thermally stable carbodiimide polymer prepared by the process of claim 1.

3. Polydiethylcarbodiimide composed of the recurring structural unit

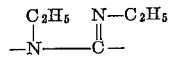

said polydiethylcarbodiimide having, by virtue of having been contacted with acetic anhydride for a time and in an amount sufficient to improve the thermal stability thereof, a thermal degradation temperature of at least about 215° C.

4. A process for enhancing the thermal stability of a solid carbodiimide polymer composed of the recurring structural unit

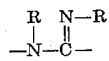

wherein R is a hydrocarbon radical selected from the group consisting of alkyl radicals, alkenyl radicals, aryl radicals, alkaryl radicals and aralkyl radicals, said hydrocarbon radical containing up to about 8 carbon atoms, which polymer is susceptible to thermal degradation when exposed to a temperature of up to about 150° C., such that the thermal degradation temperature of the polymer is raised by at least about 50° C., which process comprises the step of effecting contact between said polymer and an anhydride of a saturated monocarboxylic acid containing from 2 to about 12 carbon atoms at a temperature between about 0 and about 120° C. below that at which substantial thermal degradation of the unstabilized polymer would occur.

5. The process of claim 1 wherein said anhydride is acetic anhydride.

6. The process of claim 1 wherein said anhydride is acetic anhydride and the process is conducted at ambient temperature.

References Cited by the Examiner

UNITED STATES PATENTS

| | | | |
|---|---|---|---|
| 2,853,473 | 9/1958 | Campbell et al. | 260—2 |
| 2,941,966 | 6/1960 | Campbell | 260—2 |
| 2,941,983 | 6/1960 | Smeltz | 260—2 |

OTHER REFERENCES

Mellor: Modern Inorganic Chemistry, Longmans, Green & Co., New York, 1917; page 145 relied on.

Kosolapoff: Organophosphorus Compounds; John Wiley & Sons, Inc., New York, 1950, pp. 160–161 and 169 relied on.

Khorana: Chemical Reviews, vol. 53, #2, October 1953, pp. 145–166.

Webster's Third New International Dictionary, page 103 relied on, 1961.

WILLIAM H. SHORT, *Primary Examiner.*

LEON J. BERCOVITZ, OSCAR R. VERTIZ, *Examiners.*

H. ANDERSON, J. W. WHISLER, *Assistant Examiners.*